2,856,431

PREPARATION OF PHENYLACETALDEHYDE FROM CYCLOOCTATETRAENE

Louis E. Craig, Washington, N. J., assignor to General Aniline & Film Corporation, New York, N. Y., a corporation of Delaware No Drawing. Application December 3, 1951
Serial No. 259,719

3 Claims. (Cl. 260—599)

The present invention relates to the preparation of phenylacetaldehyde and its acetals by treating cyclooctatetraene with peracetic acid to prepare the aldehyde and then with an alcohol to prepare the corresponding acetal.

Phenylacetaldehyde and its acetals are useful in the perfume industry. These materials are quite expensive, and the art is confronted with the problem of providing them at lower cost.

It has been proposed to prepare phenylacetaldehyde from cyclooctatetraene by treatment with mercuric sulfate. However, this process is relatively costly, and in addition presents the particularly difficult problem of providing a product which is free from mercury. Furthermore, this process is inherently hazardous since it involves handling large amounts of mercury or mercuric sulfate.

It has also been suggested to treat cyclooctatetraene with perbenzoic acid and then treat with strong acid to prepare phenylacetaldehyde. However, this process is not commercially feasible because the preparation of the perbenzoic acid is costly and troublesome. There have been suggestions of treating cyclooctatetraene with hydrogen peroxide in the presence of a material such as formic acid; however, it appears that this process is not very efficient for the preparation of phenylacetaldehyde in view of the low yields of the desired product. The art appreciates that there are wide differences between reactivities of peracetic acid and perbenzoic acid, that peracetic acid may be used for preparing epoxy derivatives from certain unsaturated aliphatic compounds, and that acetic acid tends to react with an epoxide ring compound to form ester-type products.

It has been found in accordance with the invention, and surprisingly indeed, that cyclooctatetraene may be reacted with peracetic acid under conditions to give a good yield of phenylacetaldehyde. The phenylacetaldehyde may be recovered, or alternatively, the reaction mixture may be treated with an excess of an alcohol in the presence of an acidic catalyst to prepare the corresponding acetal, and then the latter may be recovered. These processes are especially interesting from the economic viewpoint in view of the substantial reductions in the cost of the finished products.

The objects achieved in accordance with the invention as described herein include the provision of economically interesting processes for the preparation of phenylacetaldehyde and its acetals; the provision of processes for reacting cyclooctatetraene with peracetic acid under conditions to give good yields of phenylacetaldehyde; the provision of processes for treating crude phenylacetaldehyde reaction mixture with an alcohol in the presence of an acidic catalyst for preparing the corresponding acetal; and other objects which will be apparent as details or embodiments of the invention are set forth hereinafter.

In order to facilitate a clear understanding of the invention, the following preferred embodiments are described in detail:

Example 1

A solution of 300 parts by volume of glacial acetic acid, 75 parts of 30% hydrogen peroxide and 5 parts of concentrated sulfuric acid was allowed to stand at room temperature for 15–16 hours. To 185 parts of this solution, maintained at −5 to 0° C. with efficient stirring, was added dropwise, 28 parts of cyclooctatetraene. After stirring for four hours at −5 to 0° C., the solution was allowed to slowly warm to room temperature. Shortly after reaching room temperature, a vigorous reaction set in and cooling was applied. When the exothermic reaction ceased, the solution was poured into 200 parts of cold water and the resulting mixture extracted exhaustively with low boiling petroleum ether. After drying the combined extracts over anhydrous sodium sulfate, the solvent was removed and the residue fractionally distilled. Phenylacetaldehyde was collected in good yield at 65–67° C. at 7 mm.

Example 2

To 185 parts of hydrogen peroxide-acetic acid solution prepared as in Example 1 was added 5 parts of anhydrous sodium acetate. The resulting solution was stirred at −5 to 0° C. while 28 parts of cyclooctatetraene were added over a period of one hour, and after stirring at −5 to 0° C. for four hours the solution was allowed to warm up to room temperature. The turbid, yellow solution was poured into 200 parts of cold water and the resulting mixture extracted exhaustively with low boiling petroleum ether. After drying the combined extracts over anhydrous sodium sulfate, the petroleum ether was removed by distillation in vacuum. The residue was added portionwise with stirring to 50 parts of 0.5% by weight methanolic sulfuric acid at a rate slow enough to prevent excessive reflux. The sulfuric acid was neutralized with a slight excess of methanolic sodium methoxide and the solution poured into 50 parts of cold water. The resulting mixture was extracted with low boiling petroleum ether, the extracts combined and dried over anhydrous sodium sulfate, and the dimethylacetal of phenylacetaldehyde isolated in good yield by fractional distillation, B. P. 90–92° C. at 7 mm.

Example 3

The procedure of Example 2 was followed except that ethanol was used in place of methanol. The diethylacetal of phenylacetaldehyde was obtained in good yield, B. P. 96–99° at 8 mm.

Example 4

The procedure of Example 2 was followed except that n-propyl alcohol was used in place of the methanol. The dipropyl acetal, B. P. 129–131° C. at 11 mm., was obtained in good yield.

In a similar manner, the di-i-amyl acetal is obtained in good yield.

It is preferred to use peracetic acid as formed in the process described herein; however, peracetic acid solution formed in other ways may be used, e. g., commercially available 40% peracetic acid in acetic acid. It would be preferable, in view of the vigorous nature of the reactions, to dilute the latter material with acetic acid, water, dilute acetic acid, ether, tertahydrofuran, chloroform, petroleum ether, or the like.

The concentration of hydrogen peroxide as peracetic acid should be in the range of 5 to 40% by weight, preferably, about 10%. The reaction temperature should be in the range of −65 to 50° C., preferably 0 to 25° C. The reaction time is generally within the range of about 1 to 24 hours, and under the preferred conditions the reaction is completed in about 3 to 8 hours. At the lower temperatures, longer reaction times are required; while at higher temperatures, undesirable side reactions occur resulting in lower yields of desired product.

In the formation of the acetal, the recovered phenylacetaldehyde may be used. However, for economic reasons, it is preferred to treat the crude phenylacetaldehyde mixture with a stoichiometric excess of the alcohol in the presence of a trace of strong acid, and then recover the acetal. For most purposes, the lower alkanols of 1 to 6 carbon atoms are preferred. However, other alcohols and alcoholic materials give the corresponding acetals when reacted in accordance with the foregoing descriptions. These may be the fatty alcohols obtained by the catalytic hydrogenation of fats and oils, the various alcohols obtained by the catalytic reaction of carbon monoxide and hydrogen, and the like. These may contain up to 20 carbon atoms or more. Unsaturated or substituted alcoholic materials may be used providing they are sufficiently stable under the above described reaction conditions and do not contain substituents which interfere with the desired reaction. If desired, mixtures of alcohols may be used to provide mixed acetals or mixtures of acetals which may be subsequently recovered and separated.

The phenylacetaldehyde may be recovered from the crude reaction mixture in an advantageous manner by converting it to the oxime, hydrazone, bisulfite addition product, or the like, separating, and then converting the separated product back to the aldehyde.

In view of the foregoing disclosures, variations and modifications of the invention will be apparent to one skilled in the art, and it is intended to include within the invention all such variations and modifications except as do not come within the scope of the appended claims.

I claim:

1. A process for the preparation of phenylacetaldehyde which comprises reacting cyclooctatetraene with a 5 to 40% peracetic acid solution in aqueous acetic acid at a temperature in the range of −65 to 50° C. for a time in the range of about 1 to 24 hours, and recovering phenylacetaldehyde.

2. The process of claim 1 wherein the peracetic acid concentration is 10% and the temperature is in the range of 0 to 25° C.

3. A process for the preparation of phenylacetaldehyde which comprises mixing glacial acetic acid and aqueous hydrogen peroxide in the presence of a small amount of sulfuric acid to thereby produce a solution of 5 to 40% peracetic acid in aqueous acetic acid, adding cyclooctatetraene while maintaining the temperature within the range of −65 to 50° C. for from 1 to 24 hours and recovering phenylacetaldehyde.

References Cited in the file of this patent

Fiat Final Report 967, "Polymerization of Acetylene to Cyclooctatetraene," pp. 47–50.